(12) United States Patent
Murphy (10) Patent No.: US 9,111,039 B2
(45) Date of Patent: Aug. 18, 2015

(54) LIMITING BANDWIDTH FOR WRITE TRANSACTIONS ACROSS NETWORKS OF COMPONENTS IN COMPUTER SYSTEMS

(75) Inventor: Michael W. Murphy, Menlo Park, CA (US)

(73) Assignee: APPLE II 'C., Cupertino, CA (US)

( * ) Notice: Subject to any disclaimer, the term of this patent is extended or adjusted under 35 U.S.C. 154(b) by 398 days.

(21) Appl. No.: 13/597,750

(22) Filed: Aug. 29, 2012

(65) Prior Publication Data

US 2014/0068131 A1   Mar. 6, 2014

(51) Int. Cl.
| | |
|---|---|
| G06F 13/00 | (2006.01) |
| G06F 13/14 | (2006.01) |
| G06F 13/36 | (2006.01) |
| G06F 13/368 | (2006.01) |

(52) U.S. Cl.
CPC ...... *G06F 13/368* (2013.01); *G06F 2213/0026* (2013.01)

(58) Field of Classification Search
CPC .......... G06F 13/00; G06F 13/14; G06F 13/36
See application file for complete search history.

(56) References Cited

U.S. PATENT DOCUMENTS

| | | | | |
|---|---|---|---|---|
| 5,732,286 | A * | 3/1998 | Leger | 710/57 |
| 5,948,081 | A * | 9/1999 | Foster | 710/40 |
| 6,490,644 | B1 * | 12/2002 | Hyde et al. | 710/125 |
| 6,877,049 | B1 * | 4/2005 | Myers | 710/56 |
| 7,162,550 | B2 * | 1/2007 | Douglas | 710/35 |
| 7,404,017 | B2 * | 7/2008 | Kuo et al. | 710/35 |
| 8,352,685 | B2 * | 1/2013 | Bannon et al. | 711/135 |
| 2005/0223124 | A1 | 10/2005 | Reed | |
| 2005/0235067 | A1 * | 10/2005 | Creta et al. | 710/5 |
| 2009/0031058 | A1 * | 1/2009 | Radhakrishnan et al. | 710/53 |
| 2009/0049450 | A1 | 2/2009 | Dunshea et al. | |
| 2011/0110237 | A1 * | 5/2011 | Wong et al. | 370/236 |
| 2012/0182889 | A1 * | 7/2012 | Saund et al. | 370/252 |
| 2013/0173843 | A1 * | 7/2013 | Balakrishnan et al. | 711/103 |

* cited by examiner

*Primary Examiner* — Khanh Dang
(74) *Attorney, Agent, or Firm* — Park, Vaughan, Fleming & Dowler LLP; Chia-Hsin Suen (57) ABSTRACT

The disclosed embodiments provide a system that facilitates use of a network of components in a computer system. The system includes a bandwidth-allocation apparatus that provides a write transaction limit for a component on the network. The system also includes a transaction-management apparatus that compares the write transaction limit to a set of outstanding write transactions for the component upon detecting a write transaction from the component to the network. If the write transaction causes the set of outstanding write transactions to exceed the write transaction limit, the transaction-management apparatus restricts transmission of the write transaction over the network.

20 Claims, 6 Drawing Sheets

LIMITING BANDWIDTH FOR WRITE TRANSACTIONS ACROSS NETWORKS OF COMPONENTS IN COMPUTER SYSTEMS

BACKGROUND

1. Field

The disclosed embodiments relate to networks of components in computer systems. More specifically, the disclosed embodiments relate to techniques for limiting bandwidth for write transactions transmitted by the components across the networks.

2. Related Art

A modern computer system typically includes a motherboard containing a processor and memory, along with a set of peripheral components connected to the motherboard via a variety of interfaces. For example, a Serial Advanced Technology Attachment (SATA) interface may facilitate data transfer between a storage device (e.g., hard disk drive, optical drive, solid-state drive, hybrid hard drive, etc.) and the motherboard, while a Peripheral Component Interconnect Express (PCIe) bus may enable communication between the motherboard and a number of integrated and/or add-on peripheral components.

In addition, the throughputs and/or latencies of the interfaces may affect the rates at which data is transferred between components in computer systems. For example, a PCIe interface may correspond to a network that connects a set of components in the computer system using a set of switches. The switches may merge transactions from peripheral components to the root complex, or chipset, of the computer system. As a result, transactions from an aggressive peripheral component to the root complex may consume available bandwidth on switches between the peripheral component and the root complex, causing other peripheral components connected to the same switches to experience increased latency on the network and, in turn, reduced performance.

Hence, what is needed is a mechanism for limiting bandwidth and/or performing load balancing for transactions transmitted across networks of components in computer systems.

SUMMARY

The disclosed embodiments provide a system that facilitates use of a network of components in a computer system. The system includes a bandwidth-allocation apparatus that provides a write transaction limit for a component on the network. The system also includes a transaction-management apparatus that compares the write transaction limit to a set of outstanding write transactions for the component upon detecting a write transaction from the component to the network. If the write transaction causes the set of outstanding write transactions to exceed the write transaction limit, the transaction-management apparatus restricts transmission of the write transaction over the network.

In some embodiments, if the write transaction does not cause the set of outstanding write transactions to exceed the write transaction limit, the transaction-management apparatus transmits the write transaction over the network and adds the write transaction to the set of outstanding write transactions. Next, the bandwidth-allocation apparatus provides a completion notification for the write transaction upon detecting a completion of the write transaction. Finally, the transaction-management apparatus removes the write transaction from the set of outstanding write transactions upon receiving the completion notification.

In some embodiments, the bandwidth-management apparatus provides the completion notification for the write transaction by generating the completion notification using information associated with the component from the write transaction and transmitting the completion notification to the component, wherein the completion notification is received by the transaction-management apparatus.

In some embodiments, the information is added to the write transaction by the transaction-management apparatus prior to transmitting the write transaction over the network. The information may include a component identifier for the component, a payload size for the write transaction, and/or a write transaction limit identifier that associates the write transaction with the write transaction limit.

In some embodiments, the write transaction limit specifies a maximum number of outstanding write transactions for the component and/or a memory limit for the outstanding write transactions.

In some embodiments, the bandwidth-allocation apparatus is provided by a processor and/or a switch in the network. For example, the bandwidth-allocation apparatus may be implemented by a root (e.g., root complex) in the network. Alternatively, the bandwidth-allocation apparatus may be implemented by a switch connected to the root if the root is not capable of specifying the write transaction limit and/or providing the completion notification.

In some embodiments, the transaction-management apparatus is provided by the component and/or a different switch in the network. For example, the transaction-management apparatus may be provided by an endpoint (e.g., disk controller, input/output (I/O) device) of the network. On the other hand, the transaction-management apparatus may be provided by a switch connected to the endpoint if the endpoint is not capable of using the write transaction limit to limit bandwidth for write transactions from the endpoint.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
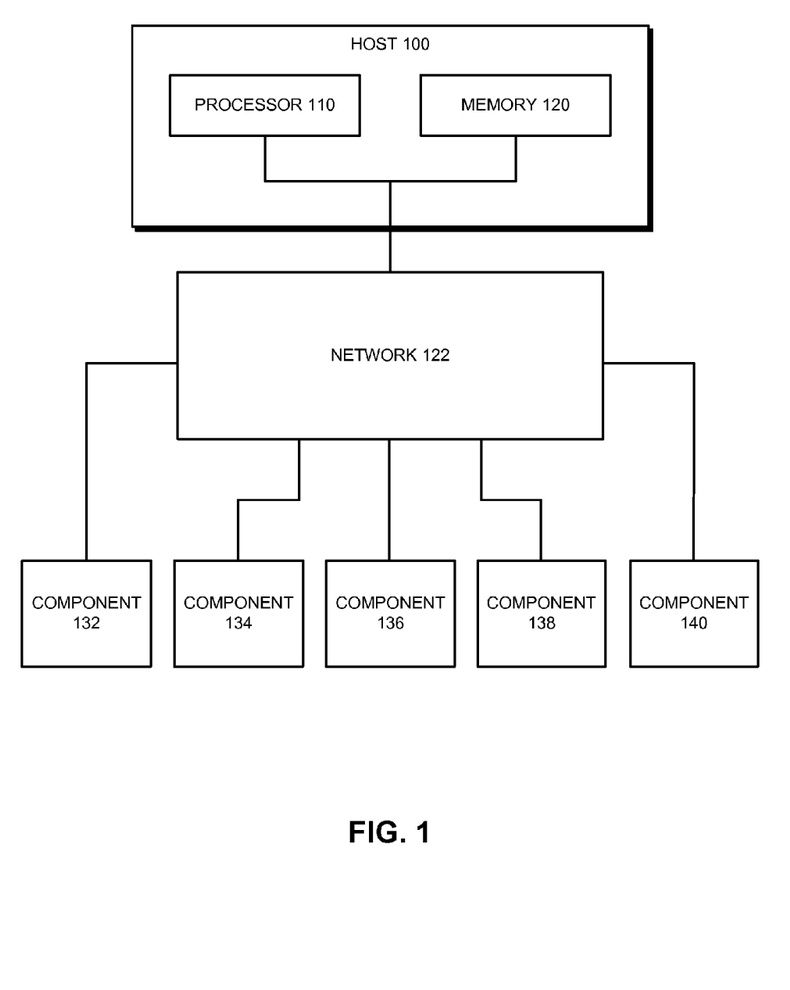
FIG. 1 shows a schematic of a system in accordance with the disclosed embodiments.

The disclosed embodiments provide a method and system for transferring data within a computer system such as a personal computer, laptop computer, portable electronic device, workstation, and/or other electronic device containing interconnected components. As shown in FIG. 1, the computer system may include a host 100 that contains a processor 110 (e.g., central processing unit (CPU)) and a memory 120, as well as a set of components 132-140 connected to one another and to host 100 by a network 122.

For example, network 122 may correspond to a Peripheral Component Interconnect Express (PCIe) network that connects a set of peripheral components (e.g., components 132-140) such as storage devices, graphics cards, network cards, and/or sound cards to a PCIe root complex associated with and/or containing processor 110. To enable communication among components connected to network 122 (e.g., components 132-140, processor 110, root complex, etc.), PCIe transactions from the components may be routed in a first-come-first-served fashion through a hierarchy of switches in network 122 to destinations associated with the transactions. PCIe completions for some or all of the transactions may then be transmitted from the destinations and routed back through the switches to the components.

Those skilled in the art will appreciate that bandwidth on network 122 may be consumed unequally by components 132-140, resulting in increased latencies and/or reduced performance for less aggressive components. For example, each hop in network 122 may specify a set of flow control credits (e.g., posted Transaction Layer Packet (TLP) flow control credits) that limit the number of transactions the hop may accept. In addition, the hops may form one or more fan-out switches that merge transactions from components 132-140 into a single port on host 100. As a result, an aggressive peripheral component (e.g., components 132-140) may post transactions that use up the flow control credits of some or all hops to the destination, thus starving other peripheral components connected to the hops and causing the other peripheral components to experience increased latencies on network 122 and/or reduced performance.

In one or more embodiments, the system of FIG. 1 includes functionality to facilitate use of network 122 by restricting the transmission of write (e.g., posted) transactions from components 132-140 to network 122. As discussed in further detail below, the system may include a bandwidth-allocation apparatus that provides a write transaction limit for a component (e.g., components 132-140, processor 110) on network 122. The system may also include a transaction-management apparatus that compares the write transaction limit to a set of outstanding write transactions for the component upon detecting a write transaction from the component to network 122. If the write transaction causes the set of outstanding write transactions to exceed the write transaction limit, the transaction-management apparatus may restrict transmission of the write transaction over network 122 by, for example, delaying transmission of the write transaction to the next hop on network 122.

If the write transaction does not cause the set of outstanding write transactions to exceed the write transaction limit, the transaction-management apparatus may transmit the write transaction over network 122 and add the write transaction to the set of outstanding write transactions. The bandwidth-allocation apparatus may then provide a completion notification for the write transaction upon detecting a completion of the write transaction, and the transaction-management apparatus may remove the write transaction from the set of outstanding write transactions upon receiving the completion notification. In other words, the bandwidth-allocation apparatus and transaction-management apparatus may provide source-to-destination flow control and/or load balancing for write transactions between components on network 122.

Figure 2:
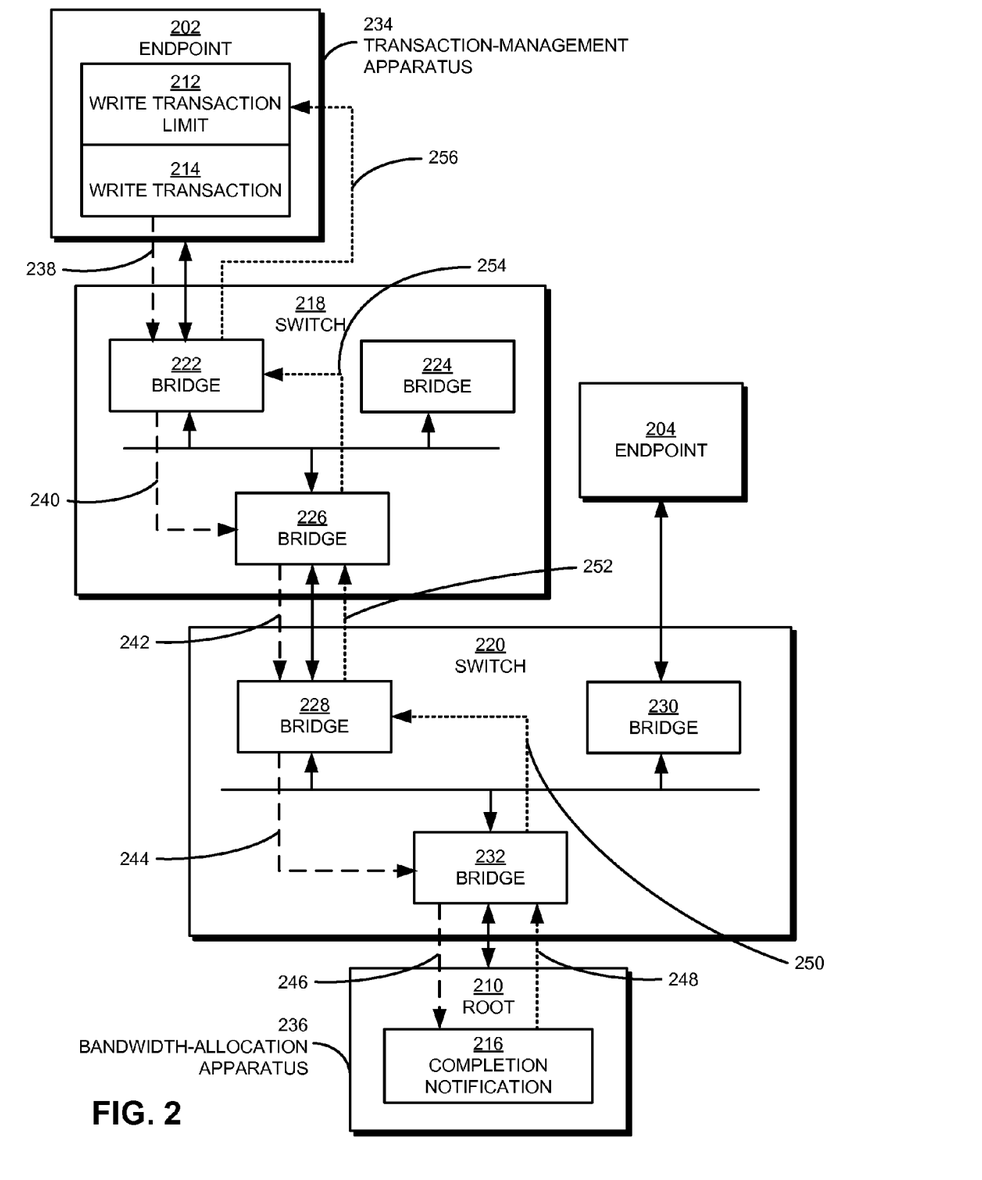
FIG. 2 shows a system for managing the transmission of a write transaction over a network of components in a computer system in accordance with the disclosed embodiments.

FIG. 2 shows a system for managing the transmission of a write transaction 214 (e.g., posted transaction) over a network (e.g., network 122 of FIG. 1) of components in a computer system in accordance with the disclosed embodiments. Write transaction 214 may be generated by an endpoint 202 of the network, such as a disk controller, input/output (I/O) device, and/or other peripheral component. In addition, write transaction 214 may be destined for a root 210 of the network, such as a root complex of a PCIe network.

As shown in FIG. 2, write transaction 214 may be routed through a hierarchy of bridges 222-232 and/or switches 218-220 in the network to root 210. In particular, endpoint 202 may make a transmission 238 of write transaction 214 to bridge 222 on switch 218, and bridge 222 may make a transmission 240 of write transaction 214 to bridge 226 on switch 218. Next, bridge 226 may make a transmission 242 of write transaction 214 to bridge 228 on switch 220, and bridge 228 may make a transmission 244 of write transaction 214 to bridge 232 on switch 220. Finally, bridge 232 may make a transmission 246 of write transaction 214 to root 210.

As mentioned above, aggressive transmission of write transactions from a component of the network may starve other components on the network. For example, flow control in the network may be implemented by associating each bridge 222-232 with a set of flow control credits that may be consumed on a first-come-first-serve basis. As a result, endpoint 202 may be capable of transmitting a continuous stream of write transactions to root 210 that consumes all available flow control credits on bridges 222, 226, 228, and 232. If endpoint 204 subsequently transmits a separate stream of transactions to root 210, the transactions from endpoint 204 may be queued behind the write transactions from endpoint 202 in bridge 232, resulting in increased latency for the transactions from endpoint 204 and/or reduced performance at endpoint 204.

To facilitate sharing of bandwidth on the network between endpoints 202-204, root 210 may operate as a bandwidth-allocation apparatus 236 that provides a write transaction limit 212 specifying a maximum number of outstanding write transactions for endpoint 202 and/or a memory limit for the outstanding write transactions. For example, bandwidth-allocation apparatus 236 may determine write transaction limit 212 and/or other write transaction limits for components on the network (e.g., root 210, endpoints 202-204, etc.) based on the available bandwidth on the network and/or usage (e.g., amounts, frequencies, patterns, etc.) of the network by the components. Bandwidth-allocation apparatus 236 may then transmit write transaction limit 212 and/or the other write transaction limits to the respective components on the network. In other words, bandwidth-allocation apparatus 236 may use a load-balancing technique to limit transmission of write transactions by the components over the network.

To enforce write transaction limit 212, endpoint 202 may provide a transaction-management apparatus 234 that tracks outstanding write transactions from endpoint 202 to the network. Upon detecting write transaction 214, transaction-management apparatus 234 may compare write transaction limit 212 to the outstanding write transactions for endpoint 202. For example, transaction-management apparatus 234 may use the outstanding write transactions and write transaction limit 212 to determine the number of outstanding write transactions and/or bytes available for subsequent write transactions from endpoint 202. If write transaction 214 causes the outstanding write transactions to exceed write transaction limit 212, transaction-management apparatus 234 may restrict transmission of write transaction 214 over the network. For example, transaction-management apparatus 234 may delay transmission of write transaction 214 to bridge 222 until write transaction 214 does not cause the outstanding write transactions to exceed the maximum number and/or memory limit specified by write transaction limit 212.

On the other hand, if write transaction 214 does not cause the outstanding write transactions to exceed write transaction limit 212, transaction-management apparatus 234 may transmit write transaction 214 over the network (e.g., using transmissions 238-246) to root 210. Prior to transmitting write transaction 214, transaction-management apparatus 234 may add information associated with endpoint 202 to write transaction 214. For example, transaction-management apparatus 234 may update write transaction 214 with a component identifier for endpoint 202, a payload size for write transaction 214, and/or a write transaction limit identifier that associates write transaction 214 with a write transaction limit (e.g., write transaction limit 212).

Root 210 may then receive write transaction 214 and complete write transaction 214 by, for example, writing the payload of write transaction 214 to memory on the computer system. Upon detecting the completion of write transaction 214, bandwidth-allocation apparatus 236 may provide a completion notification 216 for write transaction 214. In particular, bandwidth-allocation apparatus 236 may use the information added by transaction-management apparatus 234 to write transaction 214 to generate completion notification 216. For example, bandwidth-allocation apparatus 236 may identify write transaction 214 as requiring completion notification 216 using the component identifier and/or write transaction limit identifier in write transaction 214. Bandwidth-allocation apparatus 236 may also include the component identifier and/or payload size from write transaction 214 in completion notification 216 to enable identification of endpoint 202 as the recipient of completion notification 216 and/or write transaction 214 as recently completed.

Next, bandwidth-allocation apparatus 236 may use a set of transmissions 248-256 to relay completion notification 216 across the network to transaction-management apparatus 234. Bandwidth-allocation apparatus 236 may make transmission 248 to send completion notification 216 to bridge 232, bridge 232 may make transmission 250 to send completion notification 216 to bridge 228, and bridge 228 may enable transmission 252 of completion notification 216 to bridge 226. Bridge 226 may then enable transmission 254 of completion notification 216 to bridge 222, and finally, bridge 222 may make the final transmission 256 of completion notification 216 to transaction-management apparatus 234 (e.g., endpoint 202).

After transaction-management apparatus 234 receives completion notification 216, transaction-management apparatus 234 may remove write transaction 214 from the set of outstanding write transactions for endpoint 202. For example, transaction-management apparatus 234 may deduct the payload size in completion notification 216 from the amount of memory consumed by the outstanding write transactions and/or reduce the number of outstanding write transactions for endpoint 202 by one.

Bandwidth-allocation apparatus 236 and transaction-management apparatus 234 may continue to use write transaction limit 212 and completion notifications to manage the transmission of write transactions from endpoint 202. For example, bandwidth-allocation apparatus 236 and transaction-management apparatus 234 may generate completion notifications for completed write transactions from endpoint 202, update the set of outstanding write transactions based on the completion notifications, and enable or restrict the transmission of the subsequent write transactions over the network based on the updated set of outstanding write transactions and write transaction limit 212.

By adding information associated with endpoint 202 to write transaction 214 and generating completion notification 216, transaction-management apparatus 234 and bandwidth-allocation apparatus 236 may provide a unique mechanism for preventing endpoint 202 from consuming all available bandwidth on the network, independently of or in conjunction with other mechanisms for restricting bandwidth on the network (e.g., for read transactions). In turn, bandwidth-allocation apparatus 236 and transaction-management apparatus 234 may facilitate access to bandwidth on the network by endpoint 204 and/or provide load balancing among components (e.g., endpoints 202-204, root 210, etc.) on the network.

Figure 3:
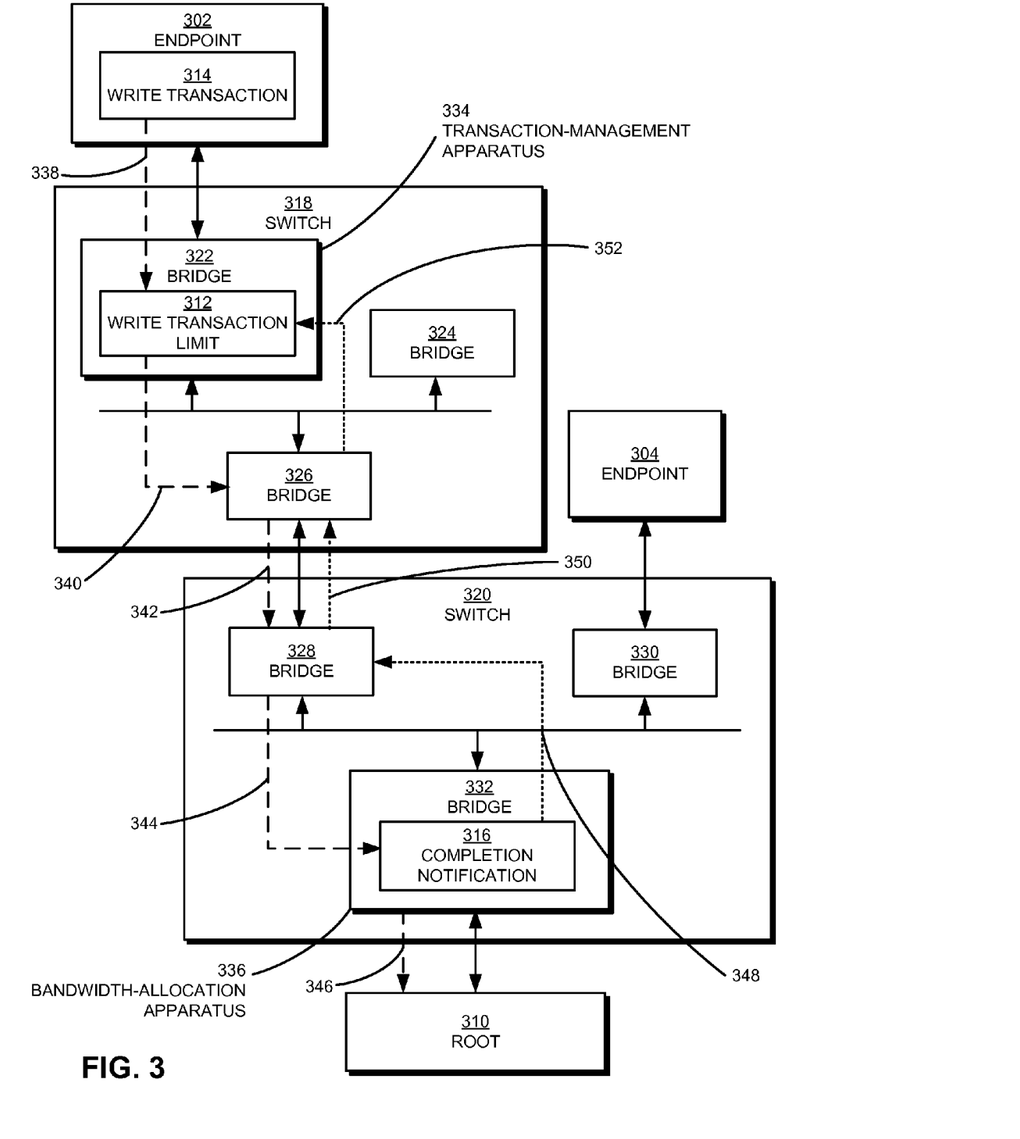
FIG. 3 shows a system for managing the transmission of a write transaction over a network of components in a computer system in accordance with the disclosed embodiments.

FIG. 3 shows a system for managing the transmission of a write transaction 314 over a network of components in a computer system in accordance with the disclosed embodiments. Like the network of FIG. 2, write transaction 314 may be generated by an endpoint 302 of the network and routed to a root 310 using a set of transmissions 338-346 between endpoint 302, a set of bridges 322-332 and/or switches 318-320, and root 310. In addition, outstanding write transactions from endpoint 302 may be restricted using a write transaction limit 312 for endpoint 302. For example, write transaction limit 312 may specify a maximum number of outstanding write transactions for endpoint 302 and/or a memory limit for the outstanding write transactions.

Moreover, write transaction limit 312 may be enforced by a bandwidth-allocation apparatus 336 and a transaction-management apparatus 334 in the network. However, unlike bandwidth-allocation apparatus 236 and transaction-management apparatus 234 of FIG. 2, bandwidth-allocation apparatus 336 and transaction-management apparatus 334 may be provided by bridge 332 on switch 320 and bridge 322 on switch 318, respectively. Implementation of bandwidth-allocation apparatus 336 and transaction-management apparatus 334 by bridges 322 and 332 and/or other hops in the network may enable source-to-destination flow control in the network, even if the network contains older components (e.g., endpoints 302-304, root 310) that are not capable of using write transaction limit 312 to limit bandwidth for write transactions from endpoint 302.

To provide such flow control, bandwidth-allocation apparatus 336 may determine write transaction limit 312 using a load-balancing technique for the network and transmit write transaction limit 312 to endpoint 302. However, write transaction limit 312 may be intercepted by transaction-management apparatus 334 before write transaction limit 312 reaches endpoint 302. Transaction-management apparatus 334 may then use write transaction limit 312 to manage the transmission of write transaction 314 and/or other write transactions from endpoint 302.

More specifically, transaction-management apparatus 334 may track a set of outstanding write transactions for endpoint 302. After receiving transmission 338 of write transaction 314 from endpoint 302, transaction-management apparatus 334 may compare the outstanding write transactions to write transaction limit 312 to determine if write transaction 314 causes the outstanding write transactions to exceed write transaction limit 312. If write transaction 314 causes the outstanding write transactions to exceed write transaction limit 312, transaction-management apparatus 334 may delay transmission 340 of write transaction 314 to bridge 326 until write transaction 314 no longer causes the outstanding write transactions to exceed write transaction limit 312 (e.g., after one or more completion notifications for the outstanding write transactions are received).

If write transaction 314 does not cause the outstanding write transactions to exceed write transaction limit 312, transaction-management apparatus 334 may enable transmission 340 of write transaction 314 to bridge 326 on switch 318. Next, bridge 326 may enable transmission 342 of write transaction 314 to bridge 328 on switch 320, and bridge 328 may enable transmission 344 of write transaction 314 to bridge 332. For example, bridges 326-328 may relay write transaction 314 to the next hop on the network as soon as flow control credits (e.g., posted TLP flow control credits) for the next hop are available.

After write transaction 314 reaches bridge 332, bandwidth-allocation apparatus 336 may generate a completion notification 316 for write transaction 314 using information (e.g., component identifier, payload size, write transaction limit identifier) added to write transaction 314 by endpoint 302 and/or transaction-management apparatus 334. Bridge 332 may then enable transmission 346 of write transaction 314 to root 310, and bandwidth-allocation apparatus 336 may transmit completion notification 316 to endpoint 302. For example, bandwidth-allocation apparatus 336 may make a transmission 348 of completion notification 316 to bridge 328, bridge 328 may provide a transmission 350 of completion notification 316 to bridge 326, and bridge 326 may enable a transmission 352 of completion notification 316 to bridge 322. Transaction-management apparatus 334 may intercept completion notification 316 and use completion notification 316 to remove write transaction 314 from the set of outstanding write transactions. Transaction-management apparatus 334 may then use the updated set of outstanding write transactions and/or subsequent completion notifications from bandwidth-allocation apparatus 336 to manage the transmission of subsequent write transactions from endpoint 302 over the network.

Those skilled in the art will appreciate that bandwidth-allocation apparatus 336 and transaction-management apparatus 334 may be implemented in a variety of ways. For example, bandwidth-allocation apparatus 336 and/or transaction-management apparatus 334 may be provided by different combinations of endpoints 302-304, bridges 322-332, switches 318-320, and/or root 310. In addition, the functionality of bandwidth-allocation apparatus 336 and/or transaction-management apparatus 334 may be used to manage transmissions over the network by other components, including endpoint 304 and root 310.

Figure 4:
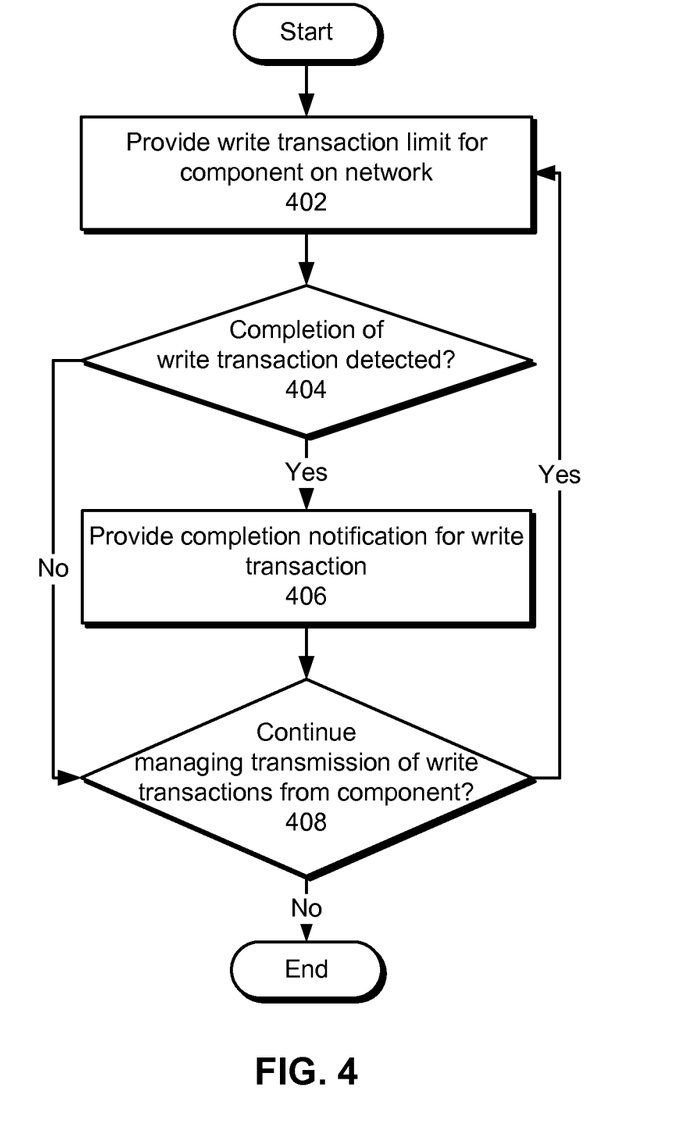
FIG. 4 shows a flowchart illustrating the process of facilitating use of a network of components in a computer system in accordance with the disclosed embodiments.

FIG. 4 shows a flowchart illustrating the process of facilitating use of a network of components in a computer system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a write transaction limit is provided for a component in the network (operation 402). The write transaction limit may be determined using a load-balancing technique. For example, the write transaction limit may be calculated based on the available bandwidth on the network and/or usage of the network by the component and/or other components on the network. The write transaction limit may then be transmitted over the network to the component and received by the component and/or a transaction-management apparatus associated with the component.

Completion of a write transaction from the component may be detected (operation 404). If completion of the write transaction is detected, a completion notification for the write transaction is provided (operation 406). The completion notification may be generated using information associated with the component from the write transaction. For example, the write transaction may include a component identifier for the component, a payload size for the write transaction, and/or a write transaction limit identifier to associate the write transaction with the write transaction limit. The component identifier and/or payload size may then be added to the completion notification to facilitate tracking of outstanding write transactions for the component, and the completion notification may be transmitted to the component. If no write transactions from the component are detected as completed, no completion notifications for the write transactions are provided.

Transmission of write transactions from the component may continue to be managed (operation 408) during use of the network by the component. For example, bandwidth for write transactions from the component may be limited as long as the component is connected to the network and/or load balancing between the component and other components on the network is performed. If transmission of write transactions is to be managed, a write transaction limit for the component and completion notifications for completed write transactions may continue to be provided (operations 402-406). On the other hand, the write transaction limit and/or completion notifications may not be provided if bandwidth for write transactions from the component is no longer to be limited.

Figure 5:
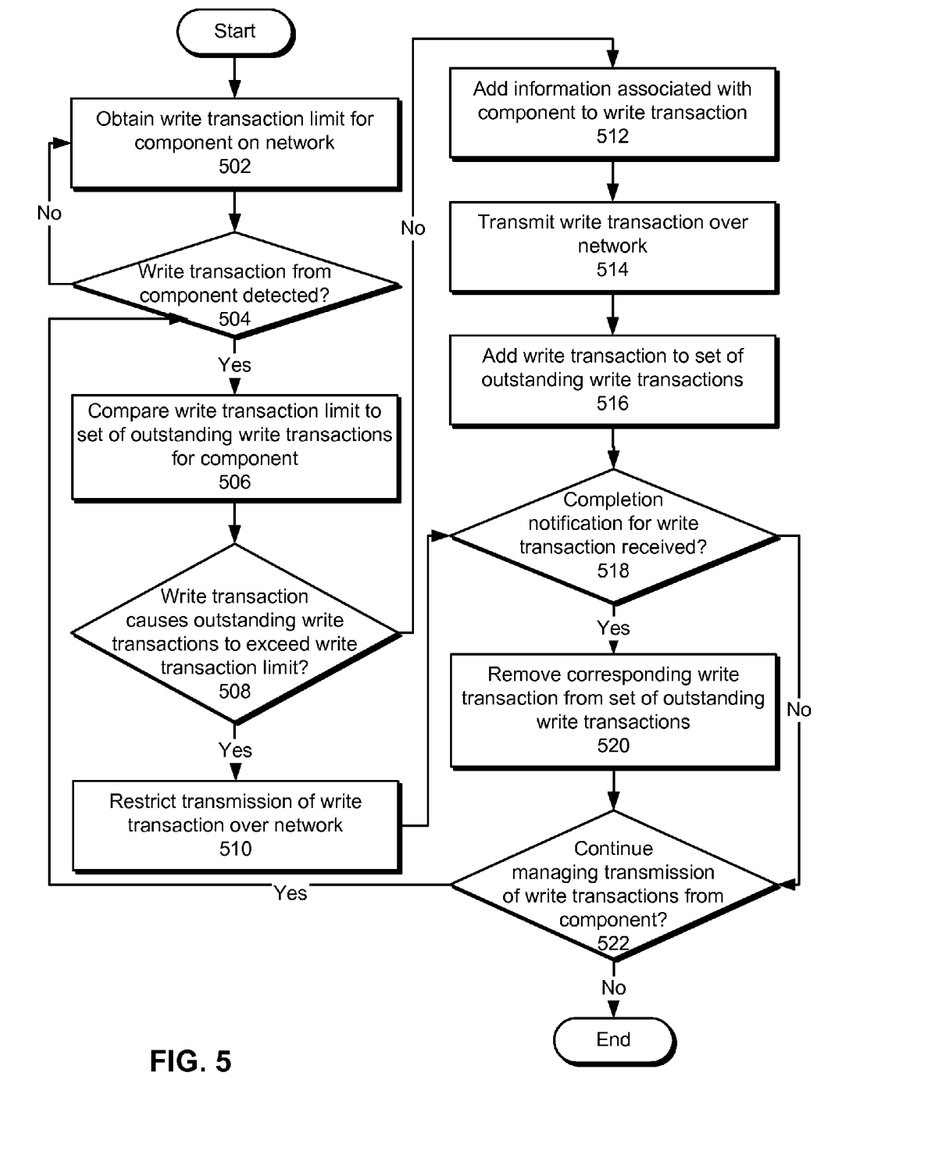
FIG. 5 shows a flowchart illustrating the process of managing the transmission of write transactions over a network of components in a computer system in accordance with the disclosed embodiments.

FIG. 5 shows a flowchart illustrating the process of managing the transmission of write transactions over a network of components in a computer system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a write transaction limit is obtained for a component of the network (operation 502). The write transaction limit may specify a maximum number of outstanding write transactions for the component and/or a memory limit (e.g., in bytes) for the outstanding write transactions. Next, a write transaction from the component to the network may be detected (operation 504). If no write transactions from the component are detected, the write transaction limit is kept and/or a new write transaction limit for the component is obtained for use in subsequent processing of write transactions from the component (operation 502).

If a write transaction from the component is detected, the write transaction limit is compared to a set of outstanding write transactions for the component (operation 506) to determine if the write transaction causes the outstanding write transactions to exceed the write transaction limit (operation 508). If the write transaction causes the outstanding write transactions to exceed the write transaction limit, transmission of the write transaction over the network is restricted (operation 510). For example, transmission of the write transaction to the next hop on the network may be delayed until the write transaction no longer causes the outstanding write transactions to exceed the write transaction limit.

Once the write transaction does not cause the outstanding write transactions to exceed the write transaction limit, information associated with the component (e.g., component identifier, payload size, write transaction limit identifier) is added to the write transaction (operation 512) to associate the write transaction with the component and/or write transaction limit. Conversely, operation 512 may be omitted if information that enables identification of the write transaction limit and/or component is already included in the write transaction (e.g., by the component).

Next, the write transaction is transmitted over the network (operation 514) and added to the set of outstanding write transactions (operation 516). A completion notification for the write transaction may also be received (operation 518) independently of operations (e.g., operations 502-516) associated with issuing the write transaction and/or other write transactions. For example, the completion notification may be received after the write transaction is processed by the destination of the write transaction, while completion notifications for other outstanding write transactions may also be received before, during, or after operations 502-516. If a completion notification is received, the corresponding write transaction is removed from the set of outstanding write transactions (operation 520). If the completion notification is not received, the corresponding write transaction is kept in the set of outstanding write transactions.

Transmission of write transactions from the component may continue to be managed (operation 522). If transmission of the write transactions is to be managed, write transactions from the component may be managed using the write transaction limit and outstanding write transactions (operations 504-516), and the outstanding write transactions may independently and/or concurrently be updated based on completion notifications for the write transactions (operations 518-520). Management of write transmissions from the component may thus continue until the component is no longer connected to the network and/or load balancing between the component and/or other components on the network is no longer performed.

Figure 6:
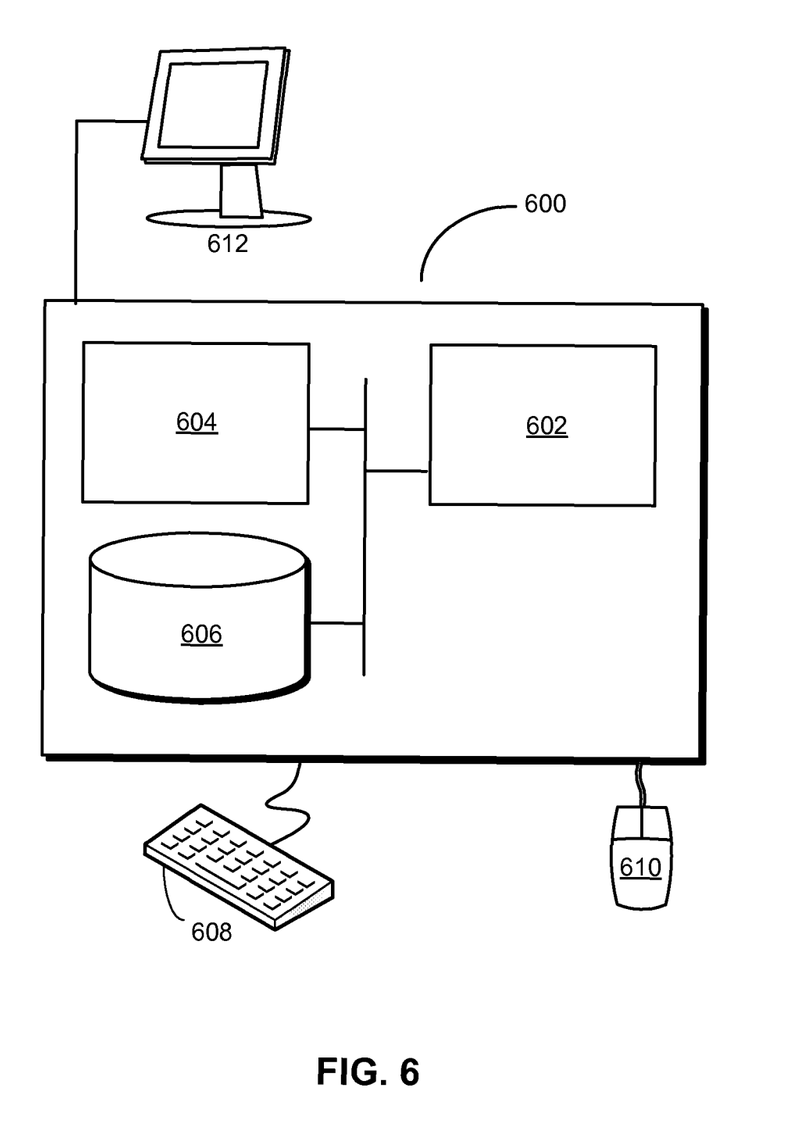
FIG. 6 shows a computer system in accordance with the disclosed embodiments.

FIG. 6 shows a computer system 600 in accordance with the disclosed embodiments. Computer system 600 may correspond to an apparatus that includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating use of a network of components in a computer system. The system may include a bandwidth-allocation apparatus that provides a write transaction limit for a component in the network. The system may also include a transaction-management apparatus that compares the write transaction limit to a set of outstanding write transactions for the component upon detecting a write transaction from the component to the network. If the write transaction causes the set of outstanding write transactions to exceed the write transaction limit, the transaction-management apparatus may restrict transmission of the write transaction over the network.

If the write transaction does not cause the set of outstanding write transactions to exceed the write transaction limit, the transaction-management apparatus may transmit the write transaction over the network and add the write transaction to the set of outstanding write transactions. Next, the bandwidth-allocation apparatus may provide a completion notification for the write transaction upon detecting a completion of the write transaction, and the transaction-management apparatus may remove the write transaction from the set of outstanding write transactions upon receiving the completion notification.

In addition, one or more components of computer system 600 may be remotely located and connected to the other components over a network. Portions of the present embodiments (e.g., bandwidth-allocation apparatus, transaction-management apparatus, components, etc.) may also be located on different nodes of a distributed system that implements the embodiments. For example, the present embodiments may be implemented using a cloud computing system that manages the transmission of write transactions among a network of remote components in one or more computer systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of a network of components in a computer system, comprising:
   providing a write transaction limit for a component on the network, wherein the write transaction limit restricts outstanding write transactions from the component to the network, the providing comprising determining the write transaction limit using a load-balancing technique and transmitting the write transaction limit to the component; and upon detecting a completion of a write transaction from the component, providing a completion notification for the write transaction, wherein the completion notification enables the transmission of additional write transactions within the write transaction limit by the component.

2. The computer-implemented method of claim 1, wherein providing the completion notification for the write transaction involves:

generating the completion notification using information associated with the component from the write transaction; and transmitting the completion notification to the component.

3. The computer-implemented method of claim 2, wherein the information comprises at least one of:

a component identifier;

a payload size; and a write transaction limit identifier.

4. The computer-implemented method of claim 1, wherein the component is at least one of a disk controller, an input/output (I/O) device, and a processor.

5. The computer-implemented method of claim 1, wherein the write transaction limit specifies at least one of:

a maximum number of outstanding write transactions; and a memory limit for the outstanding write transactions.

6. The computer-implemented method of claim 1, wherein the network is a Peripheral Component Interconnect Express (PCIe) network.

7. A computer-implemented method for managing the transmission of write transactions over a network of components in a computer system, comprising:

obtaining a write transaction limit for a component on the network; and upon detecting a write transaction from the component to the network:

comparing the write transaction limit to a set of outstanding write transactions for the component;

if the write transaction causes the set of outstanding write transactions to exceed the write transaction limit, restricting transmission of the write transaction over the network; and if the write transaction does not cause the set of outstanding write transactions to exceed the write transaction limit:

adding information associated with the component to the write transaction, wherein the information enables subsequent receipt of the completion notification;

transmitting the write transaction over the network; and adding the write transaction to the set of outstanding write transactions.

8. The computer-implemented method of claim claim 7, further comprising:

upon receiving a completion notification for the write transaction, removing the write transaction from the set of outstanding write transactions.

9. The computer-implemented method of claim 7, wherein the information comprises at least one of:

a component identifier;

a payload size; and a write transaction limit identifier.

10. The computer-implemented method of claim 7, wherein the write transaction limit is obtained from at least one of:

a processor in the computer system; and a switch in the network.

11. A system for facilitating use of a network of components in a computer system, comprising:

a bandwidth-allocation apparatus configured to provide a write transaction limit for a component on the network, the providing comprising determining the write transaction limit using a load-balancing technique and transmitting the write transaction limit to the component, wherein the write transaction limit is received by a transaction-management apparatus; and the transaction-management apparatus, wherein upon detecting a write transaction from the component to the network, the transaction-management apparatus is configured to:

compare the write transaction limit to a set of outstanding write transactions for the component; and restrict transmission of the write transaction over the network if the write transaction causes the set of outstanding write transactions to exceed the write transaction limit.

12. The system of claim 11, wherein if the write transaction does not cause the set of outstanding write transactions to exceed the write transaction limit, the transaction-management apparatus is further configured to:

transmit the write transaction over the network; and add the write transaction to the set of outstanding write transactions.

13. The system of claim 12, wherein the bandwidth-allocation apparatus is further configured to provide a completion notification for the write transaction upon detecting a completion of the write transaction, and wherein the transaction-management apparatus is further configured to remove the write transaction from the set of outstanding write transactions upon receiving the completion notification.

14. The system of claim 13, wherein providing the completion notification for the write transaction involves:

generating the completion notification using information associated with the component from the write transaction; and transmitting the completion notification to the component, wherein the completion notification is received by the transaction-management apparatus.

15. The system of claim 14, wherein the transaction-management apparatus is further configured to:

add the information to the write transaction prior to transmitting the write transaction over the network.

16. The system of claim 11, wherein the bandwidth-allocation apparatus is provided by at least one of:

a processor; and a switch in the network.

17. The system of claim 11, wherein the transaction-management apparatus is provided by at least one of:

the component; and a switch in the network.

18. A computer-readable storage medium storing instructions that when executed by a computer cause the computer to perform a method for facilitating use of a network of components in a computer system, the method comprising:

providing a write transaction limit for a component on the network, wherein the write transaction limit restricts outstanding write transactions from the component to the network, the providing comprising determining the write transaction limit using a load-balancing technique and transmitting the write transaction limit to the component; and upon detecting a completion of a write transaction from the component, providing a completion notification for the write transaction, wherein the completion notification enables the transmission of additional write transactions within the write transaction limit by the component.

19. The computer-readable storage medium of claim 18, wherein providing the completion notification for the write transaction involves:

generating the completion notification using information associated with the component from the write transaction; and transmitting the completion notification to the component.

20. The computer-readable storage medium of claim 18, wherein the write transaction limit specifies at least one of:

a maximum number of outstanding write transactions; and
a memory limit for the outstanding write transactions.

* * * * *

UNITED STATES PATENT AND TRADEMARK OFFICE
CERTIFICATE OF CORRECTION

PATENT NO. : 9,111,039 B2
APPLICATION NO. : 13/597750
DATED : August 18, 2015
INVENTOR(S) : Michael W. Murphy It is certified that error appears in the above-identified patent and that said Letters Patent is hereby corrected as shown below:

Title page:

Item [73], Assignee: delete "APPLE II'C." and insert --APPLE INC.--.

In the claims:

Column 11, Line 55, Claim 8: please delete the first instance of "claim".

Signed and Sealed this
Fifteenth Day of March, 2016

Michelle K. Lee
*Director of the United States Patent and Trademark Office*